Figure 1:
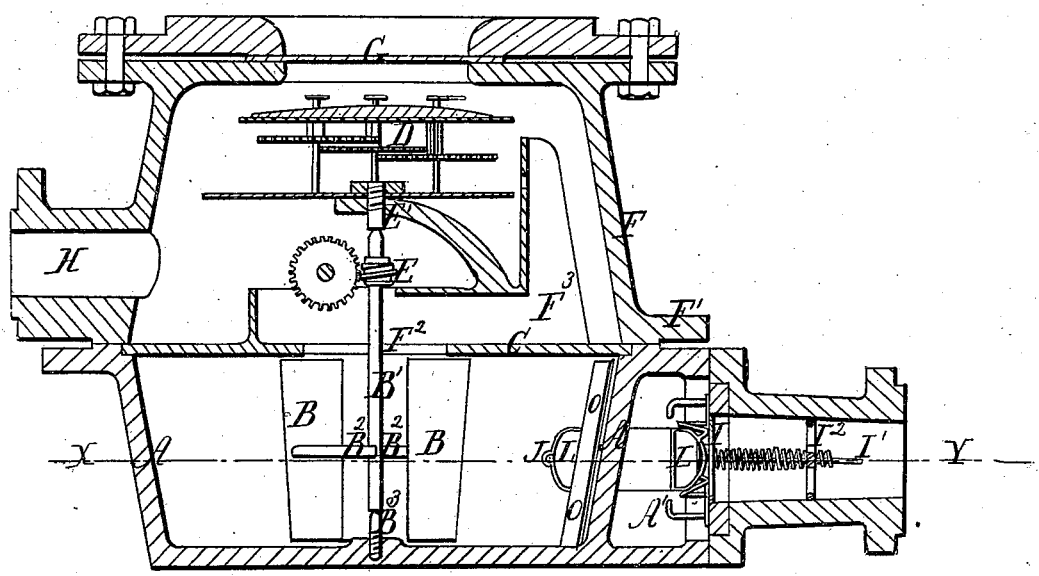
Figure 2:
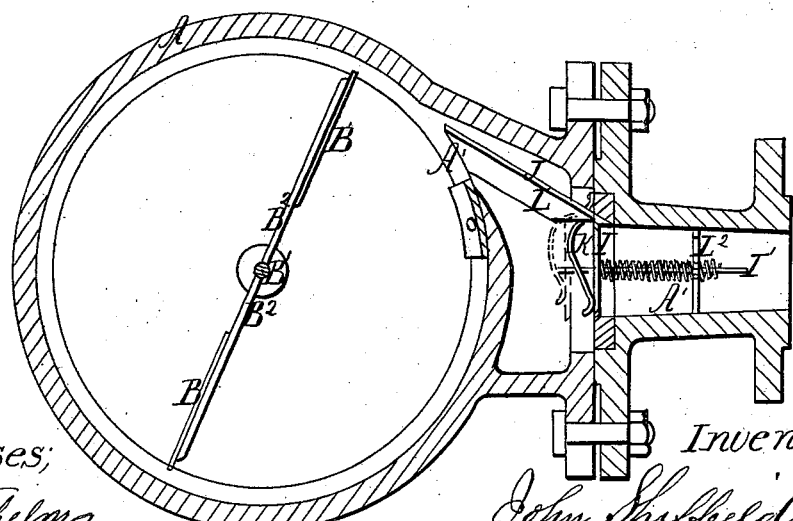

J. Sheffield.
Water-Meter.

No. 87,118.  Patented Feb. 23, 1869.

Witnesses:
Edward Wilhelm
W. B. Baker

Inventor:
John Sheffield
by Forbush & Hyatt
attys

UNITED STATES PATENT OFFICE.

JOHN SHEFFIELD, OF BUFFALO, NEW YORK.

IMPROVEMENT IN FLUID-METERS.

Specification forming part of Letters Patent No. 87,118, dated February 23, 1869.

*To all whom it may concern:*

Be it known that I, JOHN SHEFFIELD, of the city of Buffalo, in the county of Erie and State of New York, have invented certain new and useful Improvements in Water-Meters; and I do hereby declare that the following is a full, clear, and exact description thereof, reference being had to the accompanying drawings, making a part of this specification, in which—

Figure I is a vertical section thereof, taken through the inlet and outlet passages. Fig. II is a horizontal section on line $x\,y$ of Fig. I.

Like letters refer to like parts in each of the figures.

My invention relates to a meter employing an ordinary center-vent water-wheel to actuate the registering mechanism; and consists, first, in the employment of a small tube tapping the inlet-passage at a point outside of the regulating - valve, and extending within the wheel-case, so as to conduct a small stream of water to the buckets of the wheel before the pressure becomes sufficient to open said regulating-valve; second, in causing said regulating-valve, by the application of a proper spring, to open at one side first, so that, acting in combination with a conducting-tube within the wheel-case, the current of water may be carried more directly and compactly to act upon the wheel-buckets; third, in conducting a portion of the water, as it discharges from the wheel, over the face of the indices, to keep the same clean, so that their record may be easily seen through a glass-covered aperture in the inclosing-case.

A represents the wheel-case, made cylindrical or slightly conical in form, with an inlet-passage, $A^1$, tapping it tangentially at one side, as represented. B represents the wheel-buckets, carried upon the spindle $B^1$ by arms $B^2$, the spindle $B^1$ being supported in a vertical position by a footstep, $B^3$, centrally within the wheel-case. C represents a diaphragm, covering the wheel-chamber, and supporting on its top the registering mechanism and indices. (Shown generally at D.)

The construction and mode of operation of same being well known, a detailed description thereof is not deemed necessary. It is sufficient to state that the motion of the measuring-wheel is communicated thereto by a worm, E, attached to the wheel-spindle, near the top thereof. Said wheel-spindle has its upper bearing at $E^1$. Said registering mechanism is covered by the case or bonnet F, secured to the wheel-case by flanges and bolts, as shown at $F^1$. An opening is cut in the top of this bonnet, and the same covered by a glass plate, G, so that the indices may be seen from the outside, and their record noted when required.

A central aperture, $F^2$, is made in the diaphragm, through which the water is discharged, after acting upon the measuring-wheel, into the compartment formed by the bonnet F, from which it escapes through the outlet-passage H into the service-pipe connected therewith.

A passage, $F^3$, is formed above the central aperture, $F^2$, of the diaphragm, which conducts a portion of the water issuing through said aperture over the face of the indices, thereby keeping the indices clean, so that their record may be readily seen through the glass plate G in the bonnet. Without this current, the sediment of the water is liable to settle on the indices, and obscure the figures thereon. I represents the regulating-valve, applied to the inlet-passage, and closing same when seated.

The valve-stem $I^1$ passes through a bridge-piece, $I^2$, in the inlet-pipe, and has a coiled spring thereon, bearing between the valve and bridge-piece, so as to properly seat the valve. The spring is further made to pass through the bridge-piece as a screw, and its tension is regulated by being turned therein, so as to leave a greater or less length between valve and bridge-piece, or in any equivalent manner.

The object of the spring is to retain the valve in its seat until, from the opening of cocks in the service-pipe, a considerable flow of water is required, sufficient to give the current striking the buckets a velocity which will carry them with it without sensible slip.

J represents a tube of very small bore, (as compared with the inlet-passage,) tapping the inlet-passage at a point outside of the regulating-valve, and conducting a small body of water into the case and onto the wheel-buckets.

When very small quantities of water are being drawn from the service-pipe this tube will pass the same and allow the regulating-valve to remain closed, and will further cause the velocity of the ingoing current to be sufficiently great to turn the wheel without sensible slip. This is an important feature, as it is very difficult to make the regulating-valve sufficiently sensitive to operate when only a very small quantity of water is passing through the meter.

K represents a spring pressing upon one side of the regulating-valve, which is fitted sufficiently loose in its guides, so that this pressure at one side will cause it to open first at the opposite side, adjacent to which is located a tube, L, which will receive the greater portion of the water entering under these circumstances, and conduct the same in a compact body to the wheel-buckets.

Provision is thus made for the passage of currents, of three degrees of intensity—first, by the small tube J, for a very light current; second, by the larger tube L, in conjunction with the regulating-valve, for a current of medium strength; and, third, by the regulating-valve itself, for currents of maximum intensity—the object sought to be obtained being, under all circumstances of discharge from maximum to minimum, to make the velocity of the current striking the buckets such that the slip of the measuring-wheel may be nominal.

Having thus described my invention, what I claim, and desire to secure by Letters Patent, is—

1. The small tube J, tapping the inlet-passage outside of the regulating-valve and leading within the wheel-case, in the manner and for the purpose set forth.

2. The combination, with the regulating-valve I, of the spring K and tube L, for the purpose and in the manner described.

3. The passage $F^3$, arranged in relation to the central opening of the diaphragm and to the registering mechanism and indices, for preventing the deposit of sediment thereon, substantially as set forth.

JOHN SHEFFIELD.

Witnesses:
 EDWARD WILHELM,
 V. H. BECKER.